(12) United States Patent
Van Den Berg

(10) Patent No.: US 10,745,261 B2
(45) Date of Patent: Aug. 18, 2020

(54) FORKLIFT TRUCK

(71) Applicant: RAVAS EUROPE B.V., Zaltbommel (NL)

(72) Inventor: Niels Van Den Berg, Den Bosch (NL)

(73) Assignee: RAVAS EUROPE B.V., Zaltbommel (NL)

( * ) Notice: Subject to any disclaimer, the term of this patent is extended or adjusted under 35 U.S.C. 154(b) by 0 days.

(21) Appl. No.: 15/773,329

(22) PCT Filed: Oct. 31, 2016

(86) PCT No.: PCT/NL2016/050757
§ 371 (c)(1),
(2) Date: May 3, 2018

(87) PCT Pub. No.: WO2017/078518
PCT Pub. Date: May 11, 2017

(65) Prior Publication Data
US 2018/0370783 A1 Dec. 27, 2018

(30) Foreign Application Priority Data
Nov. 3, 2015 (NL) ..................................... 2015715

(51) Int. Cl.
*B66F 17/00* (2006.01)
*B66F 9/12* (2006.01)
*B66F 9/075* (2006.01)
*B66F 9/22* (2006.01)
*G01L 5/00* (2006.01)

(52) U.S. Cl.
CPC .......... *B66F 17/003* (2013.01); *B66F 9/0755* (2013.01); *B66F 9/07504* (2013.01); *B66F 9/12* (2013.01); *B66F 9/22* (2013.01); *G01L 5/0061* (2013.01)

(58) Field of Classification Search
CPC ....... B66F 17/003; B66F 9/0755; B66F 9/082
See application file for complete search history.

(56) References Cited

U.S. PATENT DOCUMENTS 4,511,974 A * 4/1985 Nakane ................ G01G 19/083
340/685
4,520,443 A * 5/1985 Yuki ........................ B66F 9/24
414/273
5,995,001 A * 11/1999 Wellman ............... B66F 17/003
340/438

(Continued)

OTHER PUBLICATIONS

Ron, Search Report (Dutch language only), dated Jun. 11, 2016, re Netherlands Patent Application No. 2015715.

*Primary Examiner* — Jonathan Snelting
(74) *Attorney, Agent, or Firm* — Perry + Currier Inc.

(57) ABSTRACT

A lifting vehicle comprises a mobile chassis with a tiltable mast (3) and a lifting device (4,5). Alerting means (15,16) are provided for the purpose of monitoring a load on the lifting device as a result of a cargo being carried thereby. The alerting means comprise a first electronic sensor 11), which records a cargo weight, and a second electronic sensor (12) which records a cargo moment. The alerting means (15,16) are provided with automatic calibration means which, when an output signal below a predetermined threshold value is generated by the one sensor (11), sets to zero an output signal differing therefrom from the other sensor (12).

15 Claims, 2 Drawing Sheets

(56) References Cited

U.S. PATENT DOCUMENTS

| | | | |
|---|---|---|---|
| 6,002,090 A | 12/1999 | Johnson et al. | |
| 6,611,746 B1* | 8/2003 | Nagai | B66F 9/0755 |
| | | | 187/222 |
| 6,779,961 B2* | 8/2004 | Barney | B66F 9/0655 |
| | | | 212/278 |
| 6,785,597 B1* | 8/2004 | Farber | B66F 17/003 |
| | | | 187/224 |
| 8,140,228 B2* | 3/2012 | McCabe | B66F 17/003 |
| | | | 414/636 |
| 9,169,110 B2* | 10/2015 | Gerdes | B66F 9/07559 |
| 2004/0200644 A1 | 10/2004 | Paine et al. | |
| 2008/0201044 A1* | 8/2008 | Yamada | B60K 28/04 |
| | | | 701/50 |
| 2009/0057065 A1* | 3/2009 | Akaki | B60T 7/126 |
| | | | 187/223 |
| 2010/0063682 A1* | 3/2010 | Akaki | B66F 17/003 |
| | | | 701/42 |

* cited by examiner

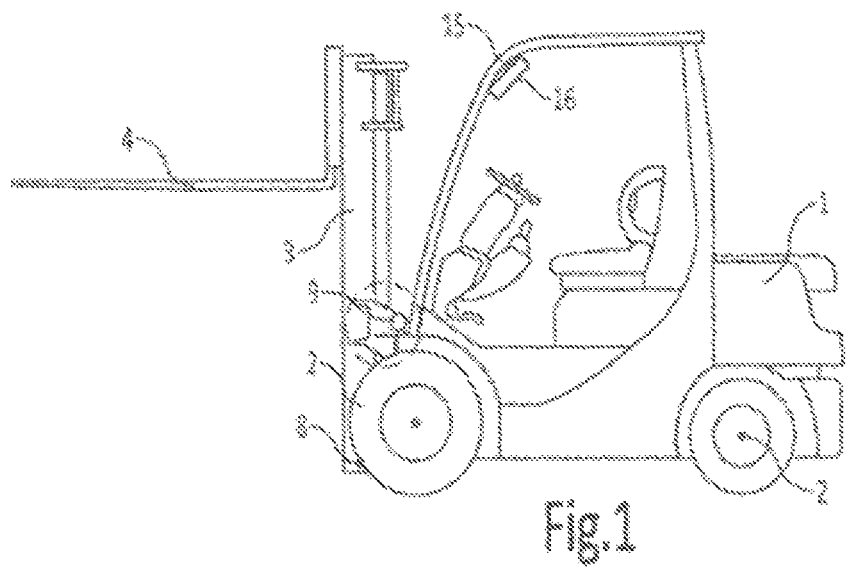
Fig. 1
Fig. 1A
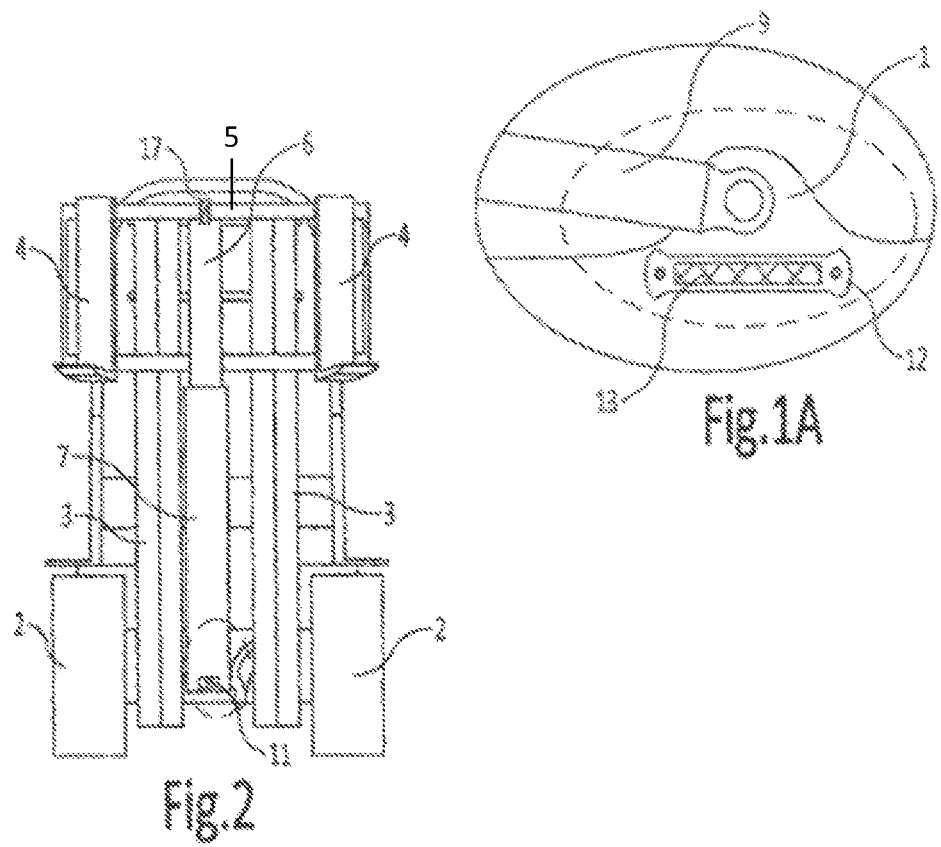
Fig. 2

FORKLIFT TRUCK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The present invention relates to a lifting vehicle, in particular a forklift truck, comprising a mobile chassis with a mast, wherein a lifting device is connected for axial movement to the mast and is coupled to a hydraulic lifting cylinder in order to perform a substantially vertical displacement, and wherein alerting means are provided for the purpose of monitoring a load on the lifting device as a result of a cargo being carried thereby.

Lifting vehicles are applied in diverse embodiments in logistics applications, often referred to simply as material handling, for the purpose of moving goods quickly and efficiently. Mainly applied here as lifting vehicle for heavier cargoes are forklift trucks with which cargoes up to several tens of tons can be lifted and displaced with a lifting device provided therein. The lifting vehicle comprises a sufficient counterweight to enable such a cargo to be carried. It is however extremely important here that the cargo will not exceed a specific maximum prescribed for the vehicle. This is expressed in a cargo chart on the vehicle which allows a maximum load depending on a lifting height, a cargo weight and a cargo position, or cargo moment.

For safe operation of a lifting vehicle such as a forklift truck it is necessary to remain within the limits of this cargo chart. For this purpose the vehicle can have been or be fitted with electronic alerting means for monitoring imminent overload of the lifting device as a result of a cargo being carried thereby. These alerting means normally comprise for this purpose one or more weight sensors for generating in real-time to the driver an indication of the weight of a cargo on the lifting device. These are for instance strain-sensitive sensors which record a mechanical deformation in or at the lifting device as a result of the cargo.

This causes a (tensile) stress which affects the strain-sensitive sensor and is generated as electronic signal. The sensor is coupled to a processing unit which is able to compare an output signal from the sensor to an optionally linear output characteristic provided therein for the purpose of deriving therefrom an indication of the actual weight of the load. The processing unit passes this indication to a monitor and/or loudspeaker provided close to the driver in order to alert the driver when a maximum allowable weight threatens to be exceeded.

A problem which occurs in practice in some cases with such alerting means is that the strain sensors applied, depending on the temperature, assembly tolerances and the operating time, display a certain drift and can as a result generate an increasingly less accurate value after a period of time. In order to overcome this an electronic calibration has to be performed periodically, whereby the output signal from sensors is reset to the associated output characteristic with which the processing unit calculates. Only then can a sufficiently accurate monitoring of the load on the vehicle be guaranteed. Such a periodic calibration does however require the necessary attention, time and discipline of a vehicle controller, and these may be disregarded.

The present invention has for its object, among others, to provide a lifting vehicle which obviates the above outlined problem to at least significant extent.

BRIEF SUMMARY OF THE INVENTION

In order to achieve the stated object a lifting vehicle of the type described in the preamble has the feature according to the invention that the alerting means comprise at least one first electronic strain and/or pressure-sensitive sensor in combination with at least one second electronic strain and/or pressure-sensitive sensor, which sensors are arranged at spatially separated positions and are coupled to a common processing device, which processing device is able and configured to determine at least a cargo weight and a cargo moment from the output signals of the first and second sensors, and that the processing device is provided with calibration means which are able and configured for the purpose, when an output signal below a predetermined threshold value is generated by the one sensor, of setting to at least substantially zero an output signal differing therefrom from the other sensor.

The invention is based here on the insight that in a cargo-free situation both a cargo weight and a cargo moment are zero, so that an output signal from both the first and second sensor should register this zero value. Because according to the invention, in the case this cargo-free situation is recorded by the one sensor, a recording differing therefrom in undesirable manner by the other sensor is corrected, an automatic calibration of both sensors takes place continuously. The sensors are hereby notably less susceptible to the above stated drift in their output characteristic. The alerting means thus continue to operate within acceptable safety margins without intervention by a vehicle controller being required for the purpose.

A particular embodiment of the lifting vehicle has the feature here according to the invention that the threshold value is at least in the order of magnitude of a measurement accuracy of the one sensor. A zero setting of the other sensor will thus already take place when a load below the measurement accuracy of the respective sensor is recorded, and then vice versa, so that both sensors are then recalibrated. In practice such a measurement accuracy is typically in the order of magnitude of 2% of the maximum load, whereby the device according to the invention remains well within safety margins set therefor.

Sensors of diverse nature can be applied. A preferred embodiment of the lifting device has in this context the feature according to the invention that at least the first sensor comprises a pressure-sensitive sensor, wherein the first sensor is able and configured to record a hydraulic pressure of the lifting cylinder. This sensor will thus record mainly a weight of the cargo. In order to also obtain an indication of a cargo moment exerted by the cargo of the lifting device, the further sensor at a spatially separated position gives further information concerning the magnitude of the load exerted by the cargo. Both a cargo weight and cargo position, or a cargo moment, can always be determined with sufficient degree of accuracy from these two measurements. Both these factors provide sufficient information to distinguish at any lifting height a safe operation from an unsafe operation in respect of the lifting vehicle.

Both sensors can be provided per se on totally different components of the vehicle, as long as these components are subject to a load exerted by the cargo of the vehicle whereby a measurable mechanical deformation occurs therein. The separate output signals from the two sensors supply the processing unit with sufficient information to calculate the cargo weight and the cargo position therefrom. A particularly practical embodiment of the lifting vehicle, which is also particularly suitable for retrofitting, is however characterized in that the lifting device comprises a lifting fork device with at least one lifting tine, wherein the at least one first and second sensor comprises a set of strain and/or pressure-sensitive sensors arranged at spatially separated positions of the lifting tine in order to record a local mechanical stress in the lifting tine, and wherein the sensors are preferably coupled wirelessly to the processing unit.

The spatially separated positions of the sensors result here in differing output signals from the sensors, depending on their individual position and on an actual position of the cargo in the lifting device. On the basis of the sum of these output signals the processing unit is able to determine a cargo weight, while a position of a centre of mass of the cargo relative to the lifting device can be determined from the differences between the signals. The tine thus comprises all that is required to determine an actually exerted tilting moment. Fitting a lifting vehicle herewith only later can still provide a overturning protection therein. The wireless signal transfer does not even require modification of the electrical cabling of the vehicle.

A further particular embodiment of the lifting device is characterized according to the invention in that the mast is tiltable about a substantially horizontal pivot axis and is coupled to a hydraulic tilt cylinder for performing tilting about the pivot axis, and that the second electronic sensor is able and configured to record and generate an indication of a load on the tilt cylinder as electronic output signal. The invention is based here on the insight that a possible alternative or negative inclination of the mast has a significant effect on the tilting moment of the lifting device as a whole. This tilting moment can be derived relatively directly from the load on the tilting or inclining cylinder.

In order to record such a possible increase or decrease in the tilting moment resulting from an inclination of the mast, a further preferred embodiment of the lifting vehicle according to the invention is characterized in that at least the second sensor comprises a strain-sensitive sensor which is arranged close to the tilt cylinder on a part of the chassis of the vehicle and is able and configured to record a mechanical stress in the respective part, and more particularly in that the mast is connected via a set of tilt cylinders to the other part of the chassis and that each of the tilt cylinders is provided with a second sensor coupled to the processing unit. The sensors are for instance mounted here such that a purely vertical position will give a neutral outcome while a rearward tilted mast and a forward tilted mast will bring about a mechanical stress and deformation in the respective chassis part, and thereby in the sensor, which will have a respectively positive or negative effect relative to the neutral outcome.

Other types of weight sensors can also be applied within the context of the invention in addition to strain and/or pressure-sensitive sensors. A further particular embodiment of the lifting vehicle according to the invention has in this respect the feature that the one sensor comprises a strain-sensitive sensor and the other sensor is an oil pressure sensor which records a hydraulic pressure in a hydraulic cylinder fitted therewith. The mutually calibrating sensors become different types of sensor here, so that a drift of the one sensor does not logically also indicate a corresponding drift in the other sensor.

In addition to a mutual self-calibration of individual weight sensors, the present inventive concept can also be applied to other types of sensor. An example hereof is provided in a further particular embodiment of the lifting vehicle which, in accordance with the same inventive concept, is characterized in that the lifting device comprises an electronic height gauge coupled to the processing unit and that the processing device is provided with height calibration means which are able and configured, when an output signal below a predetermined threshold value is generated by said sensors, to set the output signal of the height gauge to zero. This embodiment is based on the insight that the weight sensors will record an (apparently) zero load pattern, or even a negative load pattern, when the lifting device rests on a ground surface. This recording provides a calibration point for the height gauge, which can thereby be set to zero and continuously or periodically calibrated as such. This can be applied irrespective of the type of height gauge, but has been found particularly useful in a particular embodiment of the lifting vehicle which is characterized according to the invention in that the height gauge comprises an air pressure gauge.

BRIEF DESCRIPTION OF THE SEVERAL VIEWS OF THE DRAWINGS

The invention will now be further elucidated on the basis of an exemplary embodiment and an accompanying drawing. In the drawing:

FIG. 1 is a side view of an exemplary embodiment of a lifting vehicle according to the invention;

FIG. 1A is a detail drawing of a part of the device of FIG. 1;

FIG. 2 is a front view of the device of FIG. 1;

DETAILED DESCRIPTION OF THE INVENTION

Figure 3A:
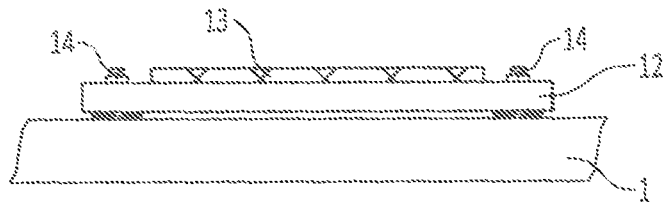
FIGS. 3A-3C show in cross-section assembly modalities for the mounting of a sensor on a structural part.

It should be noted here that the figures are purely schematic and not drawn to scale. Some parts in particular may be exaggerated to greater or lesser extent. Corresponding parts are generally designated with the same reference numeral.

FIG. 1 shows an example of a lifting vehicle 1, in this example a forklift truck, which is equipped according to the invention with alerting means which aim to assist the driver in preventing undesirable overturning of the vehicle. The lifting vehicle comprises a mobile chassis which is embodied in this example with a two-wheel axle 2 on both a front and rear side. A single wheel taking a steering form can optionally be mounted centrally at the rear. The vehicle is provided at the front with a mast 3 on which a lifting device 4 is arranged for axial movement, see also the front view of FIG. 2. The lifting device comprises in this embodiment a fork device with a double fork in the form of two tines which are laterally adjustable over a fork board 5. Fork board 5 is coupled to an output shaft 6 of a hydraulic lifting cylinder 7 and is thus adjustable in height therewith.

Mast 3 is tiltable about a substantially horizontal tilt axis 8 whereby it can if desired make a backward or forward inclining movement in addition to having a purely vertical disposition. The mast is coupled for this purpose to a hydraulic tilt cylinder 9 mounted between mast 7 and a fixed part of chassis 1. In order to monitor a safe situation irrespective of a position of the mast and a lifting height of the lifting device with a cargo placed thereon, the vehicle is embodied with alerting means for timely warning of an imminent overload.

The alerting means comprise a first electronic sensor 11 which records and generates an indication of a load on the lifting cylinder to a processing unit 15. In this example the sensor comprises a pressure-sensitive sensor which records an oil pressure in cylinder 7 as indication of a weight of the cargo on the lifting device. In the context of the invention another type of sensor can however also be applied here as first sensor, such as for instance a mechanical pressure sensor between output shaft 6 of the lifting cylinder and the lifting device or a strain and/or pressure-sensitive sensor on a part of mast 3 or elsewhere in the lifting device in order to record a mechanical deformation and stress therein as a result of the cargo.

According to the present invention the alerting means comprise at least a second sensor 12, which is likewise coupled to processing unit 15. This second sensor is able and configured to record particularly a cargo moment exerted by the load. This cargo moment depends not only on the weight of the cargo but particularly also on a position of the cargo. In this example the second sensor comprises a strain gauge 13 mounted over a part of the construction close to the tilt cylinder in order to record a mechanical deformation and stress therein as a result of the cargo. This is shown enlarged in FIG. 1A. As for first sensor 11 however, another type of sensor can also be applied as second sensor, such as particularly also a pressure sensor in the tilt cylinder.

Figure 3B:
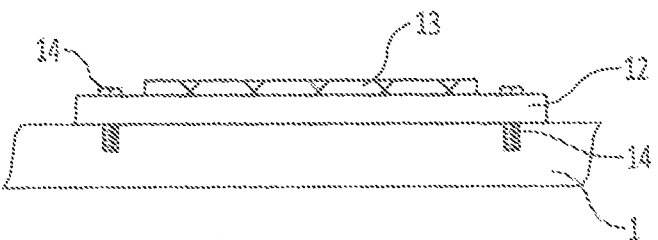
Figure 3C:
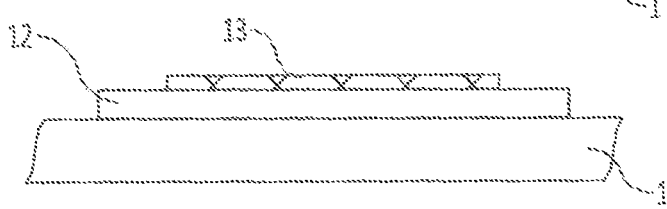

Sensor 12, 13 can be arranged in various ways on a structural part. This is further shown in FIGS. 3A-3C. In FIG. 3A small threaded ends or studs 14 are welded onto structural part 1 and sensor 12 with strain gauge 13 is secured therewith (FIG. 3A). FIG. 3B shows a mechanical reversal in the sense that in the structural part bores are provided into which the sensor is screwed fixedly with bolts, while FIG. 3C shows a glued version in which the sensor is adhered directly to the respective structural part.

Processing device 15 is able to process the electronic output signals from the first and second sensors and to calculate from the separate signals a position (Dmm) of the cargo on the lifting device in addition to a weight (Qkg). In combination with a height (Hmm) over which the cargo is raised, these values can be compared to a cargo chart of the vehicle. In order to also be able to monitor this height the lifting device is also fitted with a height gauge 17, which in this embodiment is arranged on fork board 5. Lifting tines 4 can optionally also be fitted therewith.

Figure 4:
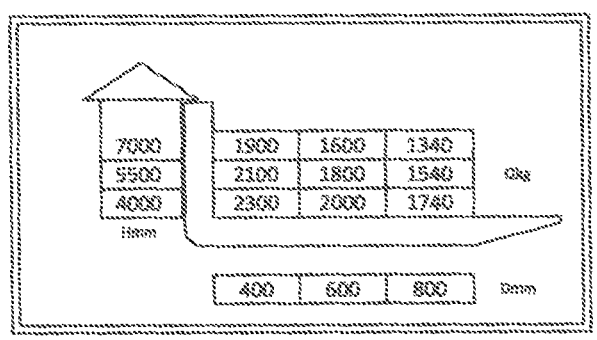
FIG. 4 shows a cargo chart as applicable for the vehicle of FIG. 1.
Figure 5:
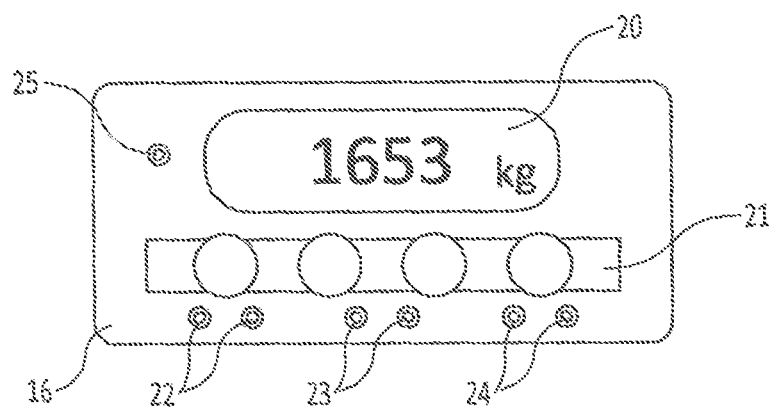
FIG. 5 shows a display panel of load alerting means as applied in the lifting vehicle of FIG. 1.

FIG. 4 shows a conventional embodiment of a cargo chart as will normally be arranged in visible manner in the lifting vehicle. Processing device 15 is loaded with an electronic counterpart hereof. On the basis hereof a safe situation can be distinguished from an unsafe one. This is indicated on a display panel 16, for instance in the form as shown in FIG. 5. This panel is located on a visible side of processing unit 15 and is thereby clearly visible to the driver of the vehicle. In addition to an alphanumeric display 20 on which a weight indication can be read, this interface comprises a series of indicators 22,23,24 (LEDs) representing a safe (22), an imminently unsafe (23) and an unsafe (24) situation, supported here by respective signal colours green, orange and red, and optionally a sound signal. Different functions of the system can be selected by means of a set of control buttons 21, while an indicator lamp (LED) 25 indicates correct operation.

A correct operation of the alerting system stands or falls on correct output signals from the different sensors 11,12,17. In practice however these are not infrequently susceptible to a certain drift as a result of for instance a mechanical deformation (creep), operating time, assembly tolerances, temperature fluctuations and other ambient conditions. In order to counter these influences, a zero measurement of the one sensor 11,12 is used according to the invention for a zero setting of the other sensor 12,11. When the one sensor records a zero load in that it records a weight of substantially zero, this should in principle correspond with a corresponding recording of the cargo moment by the other sensor. If because of varying conditions this other sensor records a higher or lower value, this can be automatically calibrated in processing unit 15 by compensating the output signal herefor electronically and/or by means of software. Conversely, a calibration of the one sensor is also possible mutatis mutandis on the basis of the output signal of the other.

A similar automatic calibration is applied to height gauge 17 arranged on the lifting device. One or both weight gauges 11,12 will record a load as soon as the cargo is lifted. When on the other hand the lifting device rests on a ground surface, these signals are no longer generated, or even a negative weight is recorded as a result of a pressure of the lifting device on the ground surface. This can be utilized as zero setting for the height gauge, which in this case should after all display a zero height.

Although the invention has been further described above on the basis of only a single exemplary embodiment, it will be apparent that the invention is by no means limited thereto. On the contrary, many variations and embodiments are still possible within the scope of the invention for a person with ordinary skill in the art.

The first and second sensor can particularly comprise a number of weight gauges, load cells, integrated at spatially separated positions into or under one or both lifting tines of the lifting device. The lifting tine will hereby already supply all sensor information necessary to determine both the cargo weight and the cargo position. In practice an electrical power supply, such as a rechargeable accumulator or battery, and communication means for wireless signal transfer to the processing unit and/or to an (image) display device are moreover advantageously added to the lifting tine so that a lifting vehicle equipped simply with one or more of such lifting tines can be provided with effective safety means which warn a driver in good time of imminent overturning of the vehicle.

Where in the foregoing a pressure- and/or strain-sensitive sensor has been applied to record a mechanical deformation in the construction as a result of the cargo, a pressure sensor can be applied instead to record the pressure in or on a hydraulic cylinder as a measure of the load exerted thereon and, vice versa, a sensor which detects an elastic deformation in a structural part can be applied instead of such a hydraulic pressure sensor.

This invention claimed is:

1. Lifting vehicle comprising a mobile chassis with a mast, wherein a lifting device is connected for axial movement to the mast and is coupled to a hydraulic lifting cylinder in order to perform a substantially vertical displacement, and wherein alerting means are provided for the purpose of monitoring a load on the lifting device as a result of a cargo being carried thereby, wherein the alerting means comprise at least one first electronic sensor, which first sensor is sensitive for at least one of strain or pressure and generates a first output signal delivering a first value that is representative of a weight of said cargo, in combination with at least one second electronic sensor, which second sensor is sensitive for at least one of strain or pressure and generates a second output signal delivering a second value that is representative of a moment of said cargo, which sensors are arranged at spatially separated positions and are coupled to a common processing device, which processing device is able and configured to determine at least a cargo weight and a cargo moment from the first and second output signals of the first and second sensors, and wherein the processing device is able and configured for, when one of the first and second output signal, generated by one of said first and second sensor, has a value below a predetermined threshold value, compensating another of the first and second output signal to represent a value of zero if that other of the first and second output signal would represent a value deviating from zero.

2. Lifting vehicle as claimed in claim 1, wherein the first sensor is able and configured to record and generate an indication of a load on the lifting cylinder as electronic output signal.

3. Lifting vehicle as claimed in claim 1, wherein at least the first sensor comprises a pressure-sensitive sensor, wherein the first sensor is able and configured to record a hydraulic pressure of the lifting cylinder.

4. Lifting vehicle as claimed in claim 1, wherein at least the first sensor comprises a strain-sensitive sensor which is arranged close to the lifting cylinder on a part of the chassis of the vehicle and is able and configured to record a mechanical stress in the respective part of the vehicle.

5. Lifting vehicle as claimed in claim 1, wherein the mast is tiltable about a substantially horizontal pivot axis and is coupled to a hydraulic tilt cylinder for performing tilting about the pivot axis, and wherein the second electronic sensor is able and configured to record and generate an indication of a load on the tilt cylinder as electronic output signal.

6. Lifting vehicle as claimed in claim 5, wherein the mast is connected via a set of tilt cylinders to another part of the chassis, and wherein each of the tilt cylinders is provided with a second sensor coupled to the processing unit.

7. Lifting vehicle as claimed in claim 5, wherein at least the second sensor comprises a strain-sensitive sensor which is arranged close to the tilt cylinder on a part of the chassis of the vehicle and is able and configured to record a mechanical stress in the respective part.

8. Lifting vehicle as claimed in claim 5, wherein at least the second sensor comprises a pressure-sensitive sensor, wherein the second sensor is able and configured to record a hydraulic pressure of the tilt cylinder.

9. Lifting vehicle as claimed in claim 1, wherein the threshold value encompasses a measurement accuracy of said one of said first and second sensor.

10. Lifting vehicle as claimed in claim 1, wherein the one of said first and second sensor comprises a strain-sensitive sensor and said other of said first and second sensor is an oil pressure sensor which records a hydraulic pressure in said hydraulic lifting cylinder fitted therewith.

11. Lifting vehicle as claimed in claim 1, wherein the lifting device comprises a lifting fork device with at least one lifting tine, wherein the at least one first and second sensor comprises a set of strain and/or pressure-sensitive sensors arranged at spatially separated positions into or under the lifting tine in order to record a local mechanical stress in the lifting tine.

12. Lifting vehicle as claimed in claim 11, wherein the sensors are coupled wirelessly to the processing device.

13. Lifting vehicle as claimed in claim 1, wherein the lifting device comprises an electronic height gauge coupled to the processing device, and wherein the processing device is able and configured for, when a value of an output signal generated by one of said first and second sensor is below a predetermined threshold value, compensating a value differing from zero of an output signal of the height gauge to zero.

14. Lifting vehicle as claimed in claim 13, wherein the height gauge comprises an air pressure sensor.

15. Lifting vehicle as claimed in claim 1, wherein said lifting vehicle comprises a forklift truck.

* * * * *